(12) United States Patent
Noh (10) Patent No.: US 11,312,260 B1
(45) Date of Patent: Apr. 26, 2022

(54) METHOD FOR CONTROLLING CHARGING CAPACITY OF ELECTRIC VEHICLE CHARGING TERMINAL CAPABLE OF CHARGING SPECIFIC ELECTRIC VEHICLE, AND SERVER USING THE SAME

(71) Applicant: BLUE NETWORKS CO., LTD., Cheonan-si (KR)

(72) Inventor: Soon Yong Noh, Cheonan-si (KR)

(73) Assignee: BLUE NETWORKS CO., LTD., Cheonan-si (KR)

( * ) Notice: Subject to any disclaimer, the term of this patent is extended or adjusted under 35 U.S.C. 154(b) by 0 days.

(21) Appl. No.: 17/363,755

(22) Filed: Jun. 30, 2021

(30) Foreign Application Priority Data

Jan. 25, 2021 (KR) .................. 10-2021-0010501

(51) Int. Cl.
*B60L 53/63* (2019.01)
*B60L 53/10* (2019.01)
*B60L 53/66* (2019.01)

(52) U.S. Cl.
CPC .............. *B60L 53/63* (2019.02); *B60L 53/11* (2019.02); *B60L 53/665* (2019.02)

(58) Field of Classification Search
USPC .......................................... 320/137
See application file for complete search history.

(56) References Cited

U.S. PATENT DOCUMENTS

| | | | | |
|---|---|---|---|---|
| 9,637,017 | B2 * | 5/2017 | Sung ........................ | B60L 58/13 |
| 9,908,421 | B2 * | 3/2018 | Koolen .................... | B60L 53/62 |
| 10,744,883 | B2 * | 8/2020 | Quattrini, Jr ............ | B60L 53/65 |
| 2004/0130292 | A1 * | 7/2004 | Buchanan ................ | B60L 53/53 320/116 |
| 2011/0078092 | A1 * | 3/2011 | Kim ......................... | B60L 53/65 705/412 |
| 2017/0274792 | A1 * | 9/2017 | Vaughan ................ | H02J 7/0013 |

FOREIGN PATENT DOCUMENTS

| | | |
|---|---|---|
| JP | 2013062918 A | 4/2013 |
| KR | 101729483 B1 | 4/2017 |

* cited by examiner

*Primary Examiner* — Jerry D Robbins
(74) *Attorney, Agent, or Firm* — Kaplan Breyer Schwarz, LLP (57) ABSTRACT

A method for controlling charging capacity of an electric vehicle charging terminal capable of charging an electric vehicle is provided. The method includes steps of: an electric vehicle charging station, (a) while the electric vehicle charging terminal is connected to the electric vehicle via a charging connector, wherein the electric vehicle charging station manages unit charging sources and includes the electric vehicle charging terminal connected with a grouped charging source created by combining part of the unit charging sources, and wherein capacity of the grouped charging source is dependent on the combined part, selecting unit charging sources to be combined as a grouped charging source by referring to required charging capacity information of the electric vehicle; and (b) (i) controlling switches for connecting the unit charging sources to create the grouped charging source and (ii) allowing the grouped charging source to charge the electric vehicle through the charging connector.

3 Claims, 4 Drawing Sheets

METHOD FOR CONTROLLING CHARGING CAPACITY OF ELECTRIC VEHICLE CHARGING TERMINAL CAPABLE OF CHARGING SPECIFIC ELECTRIC VEHICLE, AND SERVER USING THE SAME

FIELD OF THE DISCLOSURE

The present disclosure relates to a method for controlling charging capacity of an electric vehicle charging terminal capable of charging a specific electric vehicle and a server using the same.

BACKGROUND OF THE DISCLOSURE

Recently, the electric vehicle market led by Tesla has exploded. Accordingly, interest in infrastructure such as electric vehicle charging stations and electric vehicle charging terminals, which are essential for electric vehicles, has also been increasing.

However, the number of the electric vehicle charging stations currently installed in Korea is about 3,600 (source: Korea Electric Power Corporation's electric vehicle charging service, January 2021), which is significantly less than about 11,500 gas stations installed in Korea (source: Korea National Oil Corporation, July 2019).

Accordingly, compared to the number of electric vehicles expected to increase further, the number of the electric vehicle charging stations and the number of the electric vehicle charging terminals are considerably insufficient. Therefore, a method for efficiently using limited charging capacity and effectively managing the electric vehicle charging stations as well as the electric vehicle charging terminals is needed.

SUMMARY OF THE DISCLOSURE

It is an object of the present disclosure to solve all the aforementioned problems.

It is another object of the present disclosure to allow an electric vehicle charging station to (i) select at least two specific unit charging sources, among a plurality of unit charging sources, for electrical connection, as a specific grouped charging source by referring to specific required charging capacity information of a specific electric vehicle and (ii) allow the specific grouped charging source to charge the specific electric vehicle through a specific charging connector.

It is still another object of the present disclosure to combine at least part of available unit charging sources additionally with initial unit charging sources if specific required charging capacity of the specific electric vehicle is determined as greater than initially set charging capacity of the initial unit charging sources electrically connected to their corresponding specific charging connector so that the initially set charging capacity becomes equal to the specific required charging capacity.

It is still yet another object of the present disclosure, by referring to information on remaining charging capacity of the specific electric vehicle at a specific point of time while the specific electric vehicle is charged, (i) if the remaining charging capacity of the specific electric vehicle is determined as equal to or less than a preset value, to control a first fee to be imposed on the specific electric vehicle and (ii) if the remaining charging capacity of the specific electric vehicle is determined as greater than the preset value, to control a second fee to be imposed on the specific electric vehicle.

In order to accomplish objects above, representative structures of the present disclosure are described as follows.

In accordance with one aspect of the present disclosure, there is provided a method for controlling charging capacity of an electric vehicle charging terminal capable of charging a specific electric vehicle, including steps of: (a) an electric vehicle charging station, while the electric vehicle charging terminal is connected to the specific electric vehicle, via at least one specific charging connector among a first charging connector to an n-th charging connector, wherein the electric vehicle charging station manages a plurality of unit charging sources and includes the electric vehicle charging terminal, which is electrically connected with a grouped charging source created by combining at least part of the plurality of the unit charging sources, and wherein capacity of the grouped charging source is dependent on a cardinal number of combined part of the plurality of the unit charging sources, selecting at least two specific unit charging sources to be combined, among the plurality of the unit charging sources, as a specific grouped charging source by referring to specific required charging capacity information of the specific electric vehicle; and (b) the electric vehicle charging station (i) controlling switches for electrically connecting the specific unit charging sources, to thereby create the specific grouped charging source and (ii) allowing the specific grouped charging source to charge the specific electric vehicle through the specific charging connector.

As one example, at the step of (a), if the specific required charging capacity of the specific electric vehicle is determined as greater than initially set charging capacity calculated by referring to a cardinal number of initial unit charging sources electrically connected to their corresponding specific charging connector, the electric vehicle charging station controls at least part of available unit charging sources, which are not used for charging, such that the at least part of the available unit charging sources is further connected to the initial unit charging sources electrically connected to their corresponding specific charging connector, to thereby allow the electric vehicle charging station to create the specific grouped charging source at the step of (b), wherein the at least part of the available unit charging sources is selected by referring to a difference between the specific required charging capacity and the initially set charging capacity.

As one example, the electric vehicle charging station, (i) if a k-th electric vehicle is connected as the specific electric vehicle to a k-th charging connector among the first charging connector to the n-th charging connector, refers to remaining charging time information of the k-th electric vehicle and spare time information of the k-th electric vehicle, as information on the k-th electric vehicle and (ii) if a (k+1)-th electric vehicle is connected to a (k+1)-th charging connector among the first charging connector to the n-th charging connector, further refers to remaining charging time information of the (k+1)-th electric vehicle and spare time information of the (k+1)-th electric vehicle, as information on the (k+1)-th electric vehicle, and wherein, if a value of the remaining charging time information of the k-th electric vehicle is determined as less than a value of the spare time information of the k-th electric vehicle and if a value of the remaining charging time information of the (k+1)-th electric vehicle is determined as greater than a value of the spare time information of the (k+1)-th electric vehicle, the electric vehicle charging station controls at least one mobile unit charging source, which is at least part of the specific unit charging sources included in a k-th grouped charging source for the k-th electric vehicle, such that the mobile unit charging source is further connected to a (k+1)-th grouped charging source created in response to required charging capacity information of the (k+1)-th electric vehicle.

As one example, the electric vehicle charging terminal, by referring to information on remaining charging capacity of the specific electric vehicle at a specific point of time while the specific electric vehicle is charged, (i) if the remaining charging capacity of the specific electric vehicle is determined as equal to or less than a preset value, controls a first fee to be imposed on the specific electric vehicle and (ii) if the remaining charging capacity of the specific electric vehicle is determined as greater than the preset value, controls a second fee to be imposed on the specific electric vehicle.

In accordance with another aspect of the present disclosure, there is provided a server for controlling charging capacity of an electric vehicle charging terminal capable of charging a specific electric vehicle, including: while the electric vehicle charging terminal is connected to the specific electric vehicle, via at least one specific charging connector among a first charging connector to an n-th charging connector, wherein the electric vehicle charging station manages a plurality of unit charging sources and includes the electric vehicle charging terminal, which is electrically connected with a grouped charging source created by combining at least part of the plurality of the unit charging sources, and wherein capacity of the grouped charging source is dependent on a cardinal number of combined part of the plurality of the unit charging sources, at least one memory that stores instructions; and at least one processor configured to execute the instructions to perform or support another device to perform: (I) a process of selecting at least two specific unit charging sources to be combined, among the plurality of the unit charging sources, as a specific grouped charging source by referring to specific required charging capacity information of the specific electric vehicle and (II) (i) a process of controlling switches for electrically connecting the specific unit charging sources, to thereby create the specific grouped charging source and (ii) a process of allowing the specific grouped charging source to charge the specific electric vehicle through the specific charging connector.

As one example, at the process of (I), if the specific required charging capacity of the specific electric vehicle is determined as greater than initially set charging capacity calculated by referring to a cardinal number of initial unit charging sources electrically connected to their corresponding specific charging connector, the processor performs or supports another device to perform a process of controlling at least part of available unit charging sources, which are not used for charging, such that the at least part of the available unit charging sources is further connected to the initial unit charging sources electrically connected to their corresponding specific charging connector, to thereby allow the electric vehicle charging station to create the specific grouped charging source at the process of (II), wherein the at least part of the available unit charging sources is selected by referring to a difference between the specific required charging capacity and the initially set charging capacity.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to those skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Unless otherwise noted in this specification or clearly contradicted in the context, an item indicated in the singular includes those in the plural, unless otherwise required in the context. These embodiments will be described in sufficient detail by referring to attached drawings regarding the embodiments of the present invention to enable those skilled in the art to practice the invention.

Figure 1:
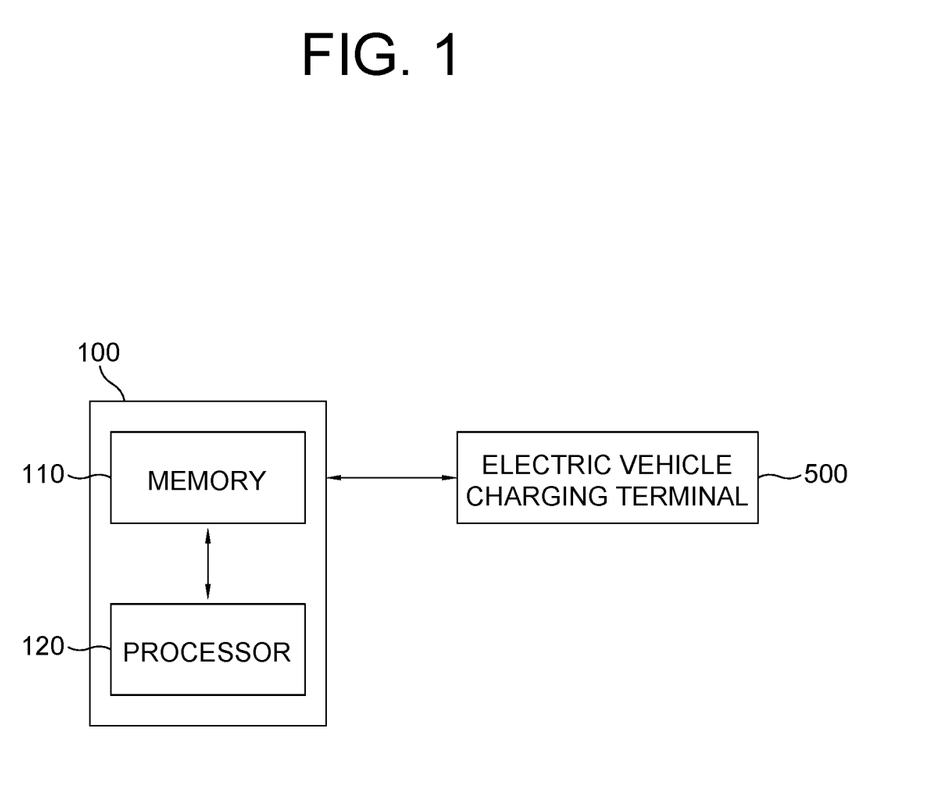
FIG. 1 is a drawing schematically illustrating a configuration of a server for controlling charging capacity of an electric vehicle charging terminal capable of charging a specific electric vehicle in accordance with one example embodiment of the present disclosure.

FIG. 1 is a drawing schematically illustrating a configuration of a server for controlling charging capacity of an electric vehicle charging terminal capable of charging a specific electric vehicle in accordance with one example embodiment of the present disclosure.

By referring to FIG. 1, the server 100 in accordance with the present disclosure may include a memory 110 and a processor 120.

Herein, the memory 110 of the server 100 may store instructions for the processor 120, and the instructions may be code generated to allow the server 100 to be operated in a specific way, and may be stored in the memory usable or readable by a computer, i.e., a programmable data processing device, or in the computer. The instructions may execute the processes described in the present disclosure.

And the processor 120 of the server 100 may include hardware configuration of MPU (Micro Processing Unit) or CPU (Central Processing Unit), cache memory, data bus, etc. Additionally, any operating systems (OS) and software configuration of applications that achieve specific purposes may be further included.

Also, the server 100 may be linked with a database (not illustrated) which stores information used for controlling or supporting control of the charging capacity of the electric vehicle charging terminal 500 capable of charging the specific electric vehicle. Herein, the database may include at least part of memory of a flash memory type, a hard disk type, a multimedia card micro type, or a card type (for example, SD or XD memory), Random Access Memory (RAM), SRAM (Static Random Access Memory), Read Only Memory (ROM), EEPROM (Electrically Erasable Programmable Read Only Memory), PROM (Programmable Read Only Memory), magnetic memory, magnetic disk, optical disk, but the scope of the present disclosure is not limited thereto, and may include any media capable of storing data. Also, the database (i) may be installed independently of the server 100, (ii) may be included in the server 100 and may store the data transmitted or received, or (iii) may be configured as two or more separate databases, and this may vary according to implementation of the present disclosure.

In addition, the server 100 may transmit and receive information to and from the electric vehicle charging terminal 500 through a communication part (not illustrated). Further, the server 100 may transmit and receive information to and from an electric vehicle connected to the electric vehicle charging terminal 500 by a charging connector. As another example, information may be transmitted and received through V2X communication using a Wireless Access in Vehicular Environments (WAVE) known as a vehicular wireless access (IEEE 802.11p), but the scope of the present disclosure is not limited thereto.

A method for controlling the charging capacity of the electric vehicle charging terminal 500 capable of charging the specific electric vehicle by using the server 100 in accordance with one example embodiment of the present disclosure is described by referring to FIG. 2 as follows.

Figure 2:
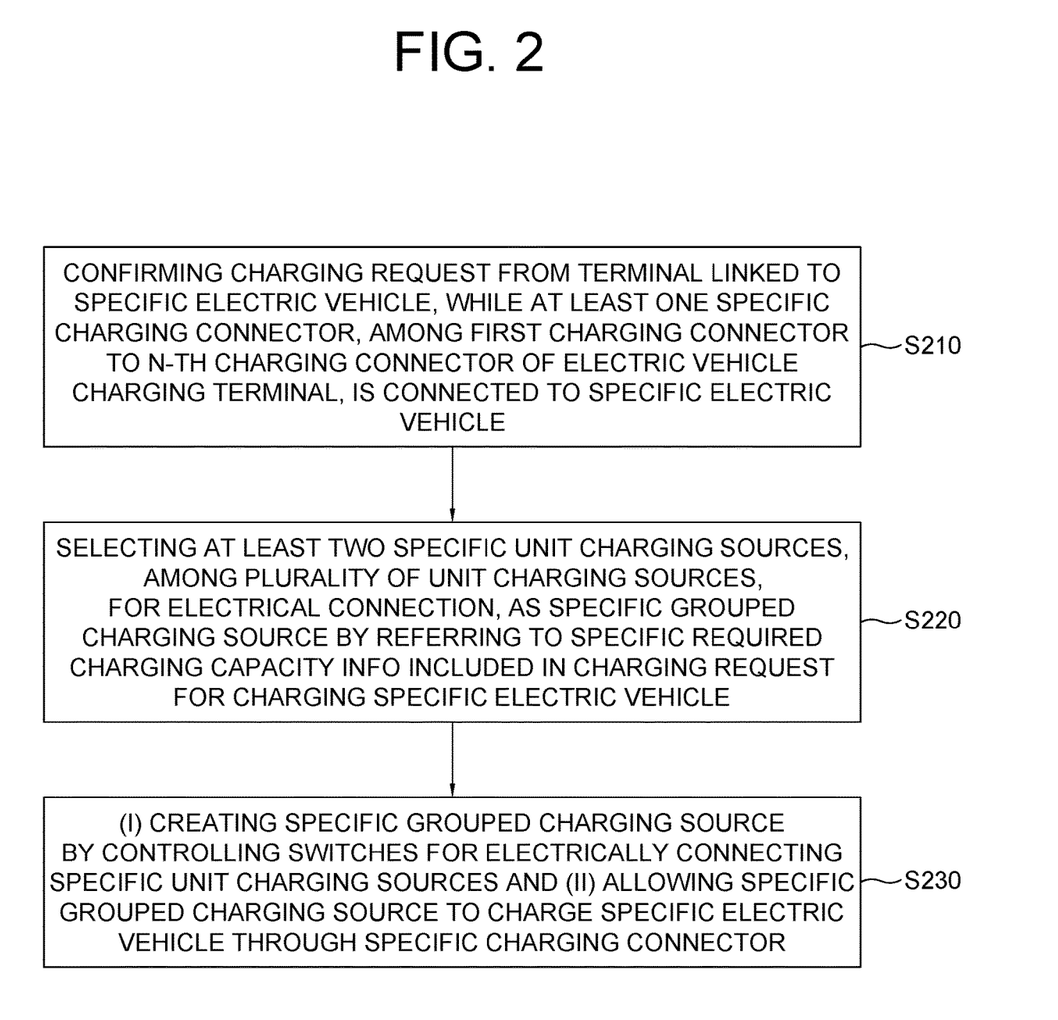
FIG. 2 is a drawing schematically illustrating steps of a method for controlling the charging capacity of the electric vehicle charging terminal capable of charging the specific electric vehicle in accordance with one example embodiment of the present disclosure.

FIG. 2 is a drawing schematically illustrating steps of the method for controlling the charging capacity of the electric vehicle charging terminal capable of charging the specific electric vehicle in accordance with one example embodiment of the present disclosure.

The electric vehicle charging terminal 500 may be characterized in that it manages a plurality of unit charging sources and that it is electrically connected to a grouped charging source created by combining, i.e., electrically connecting, at least part of the plurality of the unit charging sources.

Herein, capacity of the grouped charging source may depend on a cardinal number of electrically connected part of the plurality of the unit charging sources. For example, two unit charging sources may be combined, i.e., electrically connected, to form the grouped charging source, and if the grouped charging source created by combining two unit charging sources is already present, an additional unit charging source may be combined with the grouped charging source such that a cardinal number of the unit charging sources included in the grouped charging source is updated to three. In addition, one grouped charging source and another grouped charging source may be combined, and still another grouped charging source may be additionally combined therewith. In conclusion, a whole or at least part of the unit charging sources included in the electric vehicle charging terminal 500 may be combined, i.e., electrically connected, or each of the unit charging sources may be used as one unit charging source.

First, a request for charging the specific electric vehicle may be acquired from a user terminal linked to the specific electric vehicle, while at least one specific charging connector, among a first charging connector to an n-th charging connector of the electric vehicle charging terminal 500, is connected to the specific electric vehicle, at a step of S210.

And, by referring to specific required charging capacity information included in the request, at least two specific unit charging sources, among the plurality of the unit charging sources, for electrical connection, may be selected as a specific grouped charging source, at a step of S220.

Next, (i) the specific grouped charging source may be created by controlling switches for electrically connecting the specific unit charging sources and (ii) the specific grouped charging source may be allowed to charge the specific electric vehicle through the specific charging connector, at a step of S230.

Herein, at the step of S220, if the specific required charging capacity of the specific electric vehicle is determined as greater than initially set charging capacity calculated by referring to a cardinal number of initial unit charging sources having been electrically connected to their corresponding specific charging connector, at least part of available unit charging sources, which are not being used for charging, may be controlled such that the at least part of the available unit charging sources is further connected to the initial unit charging sources electrically connected to their corresponding specific charging connector. Herein, the at least part of the available unit charging sources may be selected by referring to a difference between the specific required charging capacity and the initially set charging capacity.

For example, assume that the specific required charging capacity of the specific electric vehicle is 50 kWh and that the initially set charging capacity of the specific charging connector connected to the specific electric vehicle is 20 kWh. If the capacity of the unit charging source is 10 kWh, this example assumes that two unit charging sources are already combined at the time of the request received from the specific electric vehicle. In this case, the specific required charging capacity of the specific electric vehicle is 30 kWh greater than the initially set charging capacity of the specific charging connector. Therefore, among the available unit charging sources connected to available charging connectors that are not currently used for charging, a part of the available unit charging sources corresponding to 30 kWh may be controlled to be combined with a specific grouped charging source corresponding to the specific charging connector in order to charge the specific electric vehicle by an amount of 50 kWh.

Meanwhile, the electric vehicle charging terminal 500 may be used for charging an electric vehicle, and the electric vehicle charging station may be a charging station including at least one electric vehicle charging terminal 500. Herein, one electric vehicle charging terminal 500 may be controlled, or a plurality of electric vehicle charging terminals 500 included in the electric vehicle charging station may be controlled.

Figure 3:
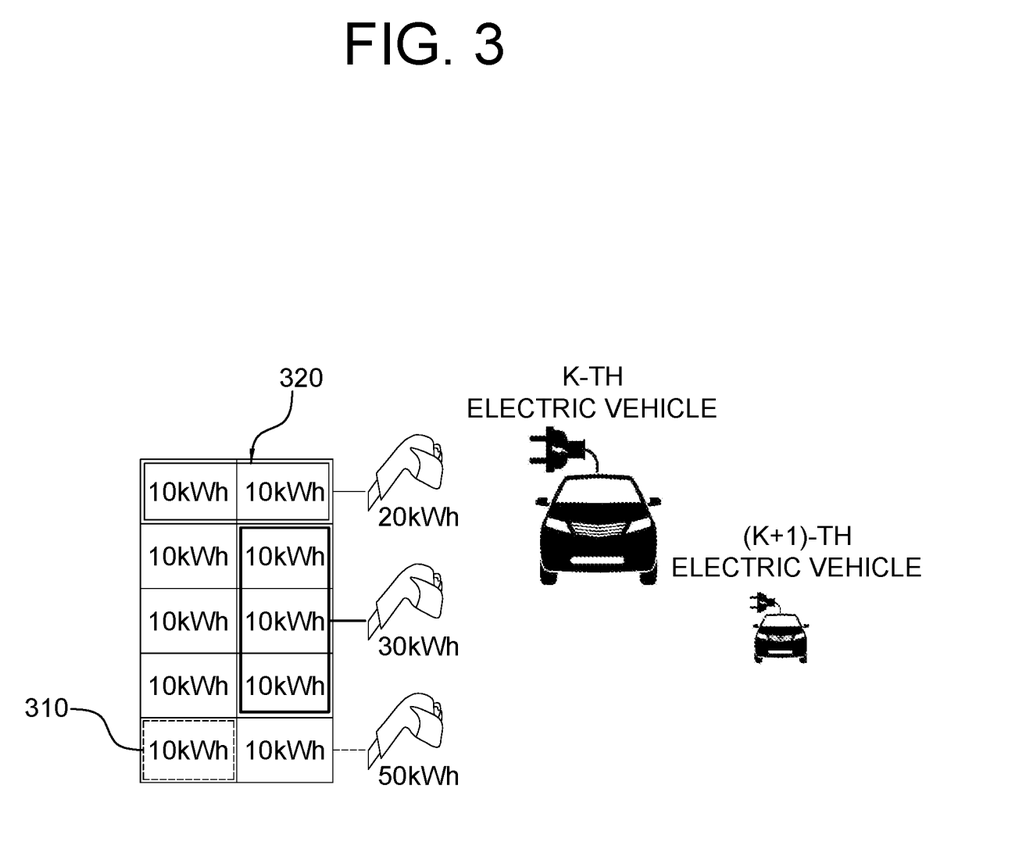
FIG. 3 is a drawing schematically illustrating an example of the method for controlling the charging capacity of the electric vehicle charging terminal capable of charging the specific electric vehicle in accordance with one example embodiment of the present disclosure.

FIG. 3 is a drawing schematically illustrating an example of the method for controlling the charging capacity of the electric vehicle charging terminal capable of charging the specific electric vehicle in accordance with one example embodiment of the present disclosure.

By referring to FIG. 3, the electric vehicle charging terminal 500 may include or manage the plurality of the unit charging sources. That is, FIG. 3 shows 10 unit charging sources, and each unit charging source has each charging capacity of 10 kWh. One unit charging source 310 as shown in FIG. 3 may be an available unit charging source that is not connected to any charging connectors. And the k-th grouped charging source 320 as shown in FIG. 3 may have the initially set charging capacity of 20 kWh as a result of combining two unit charging sources and may be electrically connected to its corresponding k-th charging connector.

Also, by referring to FIG. 3, if a k-th electric vehicle is connected as the specific electric vehicle to the k-th charging connector among the first charging connector to the n-th charging connector, the server 100 may refer to remaining charging time information of the k-th electric vehicle and spare time information of the k-th electric vehicle, as information on the k-th electric vehicle.

For example, suppose that the k-th electric vehicle is connected to the k-th charging connector having the initially set charging capacity of 20 kWh and is about to be charged. If it takes 30 minutes for the k-th electric vehicle to be charged, the remaining charging time information is set to 30 minutes. In addition, the spare time of the k-th electric vehicle may also be referred to. For example, if the spare time of the k-th electric vehicle is 50 minutes, since the remaining charging time is 30 minutes, it may be determined that remaining spare time is 20 minutes.

That is, in the above case, since there is more spare time (i.e., 50 minutes) than the remaining charging time (i.e., 30 minutes), additional control may not be required in a charging process.

However, suppose that the (k+1)-th electric vehicle is connected to the (k+1)-th charging connector with the initially set charging capacity of 30 kWh and is about to be charged. If the remaining charging time of the (k+1)-th electric vehicle is 30 minutes and if the spare time is 20 minutes, the (k+1)-th electric vehicle has the remaining spare time of −10 minutes. That is, since the remaining charging time is longer than the spare time, an adjustment of adding the unit charging source additionally to the (k+1)-th grouped charging source (i.e., 30 kWh), having been electrically connected to its corresponding (k+1)-th charging connector, is required, and for this, additional control as below is required.

In this case, if there is an available unit charging source that is not being used for charging, this may be controlled to be additionally combined with the (k+1)-th grouped charging source having been electrically connected to its corresponding (k+1)-th charging connector. However, if there is no available unit charging source, a mobile unit charging source that is at least part of the k-th grouped charging source (i.e., 20 kW) electrically connected to its corresponding k-th charging connector, which is further connected to the k-th electric vehicle with sufficient spare time, may be controlled to be combined with a (k+1)-th grouped charging source having been electrically connected to its corresponding (k+1)-th charging connector.

Therefore, the (k+1)-th electric vehicle may be allowed to be charged by using more than 30 kWh, which is the initially set charging capacity of the (k+1)-th charging connector, so that the remaining charging time of the (k+1)-th electric vehicle corresponds to the spare time.

Figure 4:
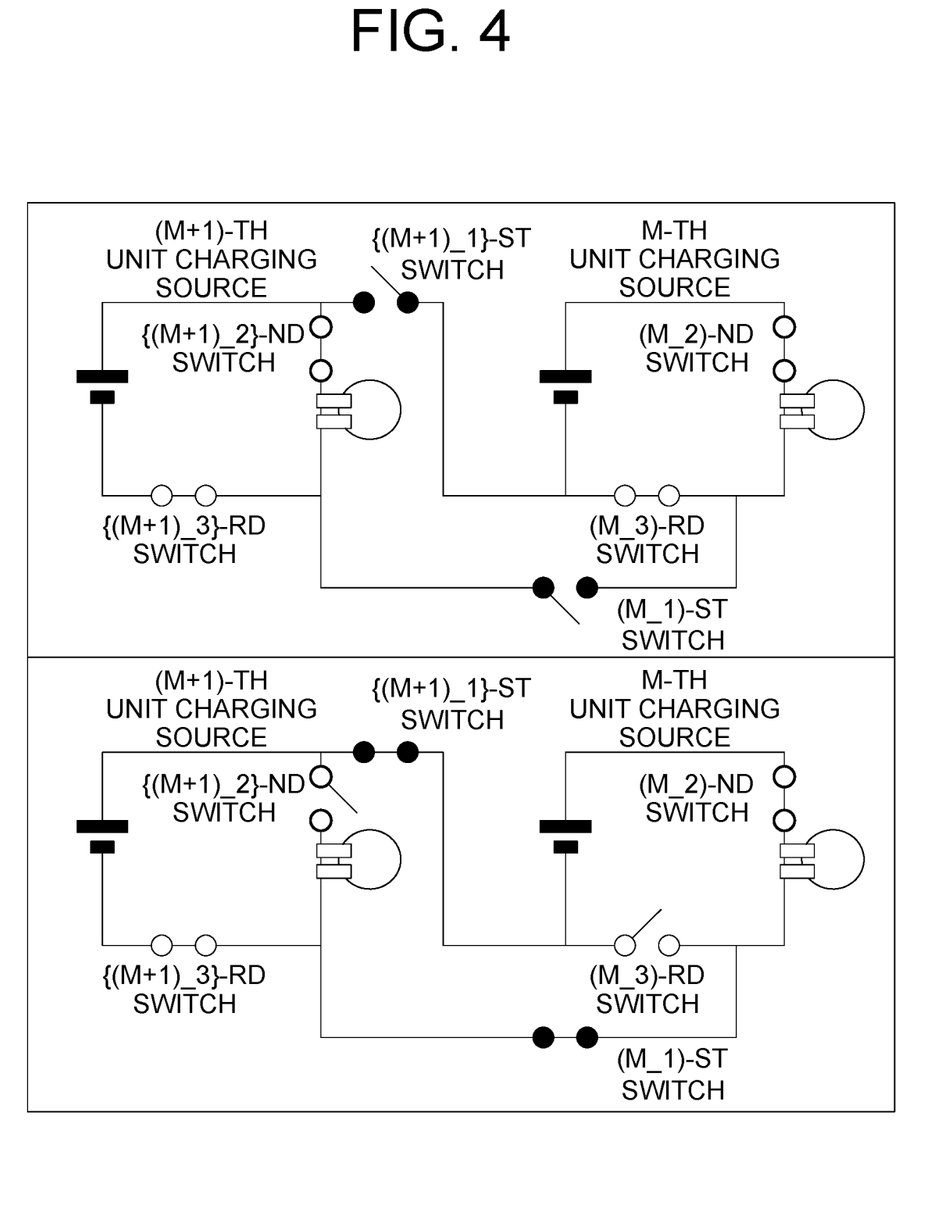
FIG. 4 is a drawing schematically illustrating a circuit configuration of the method for controlling the charging capacity of the electric vehicle charging terminal capable of charging the specific electric vehicle in accordance with one example embodiment of the present disclosure.

FIG. 4 is a drawing schematically illustrating a circuit configuration of the method for controlling the charging capacity of the electric vehicle charging terminal capable of charging the specific electric vehicle in accordance with one example embodiment of the present disclosure.

By referring to an upper part of FIG. 4, a first mode in which each unit charging source operates independently is shown. Although an m-th unit charging source and an (m+1)-th unit charging source are combined, they operate independently since an (m_1)-st switch and an {(m+1)_1}-st switch are open.

Herein, the m-th unit charging source may include at least one power source, at least two switches (an (m_2)-nd switch and an (m_3)-rd switch), and at least one output end. Also, one end of the (m_3)-rd switch may be connected to a negative pole of the power source, one end of the (m_2)-nd switch may be connected to a positive pole of the power source, and the other end of the (m_3)-rd switch and the other end of the (m_2)-nd switch may be connected to the output end. Further, an (m+1)-th unit charging source may be similarly configured. Herein, the (m_1)-st switch is a first switch of the m-th unit charging source and the {(m+1)_1}-st switch is a first switch of the (m+1)-th unit charging source.

Although the upper part of FIG. 4 shows exemplarily that two unit charging sources are combined, all of the plurality of the unit charging sources may be combined in the same manner.

Meanwhile, by referring to a lower part of FIG. 4, in a second mode where the m-th unit charging source and the (m+1)-th unit charging source are combined to form the grouped charging source, the (m_1)-st switch and the {(m+1)_1}-st switch may be controlled to be closed and the (m_3)-rd switch and an {(m+1)_2}-nd switch may be controlled to be opened.

Herein, more unit charging sources may be combined, i.e., electrically connected, and any unit charging source may be the m-th unit charging source or the (m+1)-th unit charging source.

Meanwhile, by referring to information on remaining charging capacity of the specific electric vehicle at a specific point of time while the specific electric vehicle is charged, the electric vehicle charging terminal 500 may, (i) if the remaining charging capacity of the specific electric vehicle is determined as equal to or less than a preset value, control a first fee to be imposed on the specific electric vehicle and (ii) if the remaining charging capacity of the specific electric vehicle is determined as greater than the preset value, control a second fee to be imposed on the specific electric vehicle.

For example, if the preset value of the remaining charging capacity is set to 80%, a basic fee may be imposed on the specific electric vehicle if the remaining charging capacity at the time when the specific electric vehicle is charged is 80% or less. The basic fee may correspond to charged amount of electricity.

However, if the remaining charging capacity of the specific electric vehicle exceeds 80%, the basic fee and an additional fee may be imposed on the specific electric vehicle. Due to characteristics of the electric vehicle, a charging speed decreases significantly while the remaining charging capacity exceeds 80%. Therefore, since the charged amount of the electricity is not much while the remaining charging capacity exceeds 80%, charging takes a long time, and thus the additional fee may be added to the basic fee.

The present disclosure has an effect of allowing the electric vehicle charging station to (i) select at least two specific unit charging sources, among the plurality of the unit charging sources, for electrical connection, as the specific grouped charging source by referring to the specific required charging capacity information of the specific electric vehicle and (ii) allow the specific grouped charging source to charge the specific electric vehicle through the specific charging connector.

The present disclosure has another effect of combining at least part of the available unit charging sources additionally with the initial unit charging sources, if the specific required charging capacity of the specific electric vehicle is determined as greater than the initially set charging capacity of the initial unit charging sources having been electrically connected to its corresponding specific charging connector, so that the initially set charging capacity becomes equal to the specific required charging capacity.

The present disclosure has still another effect of, by referring to the information on the remaining charging capacity of the specific electric vehicle at the specific point of time while the specific electric vehicle is charged, (i) if the remaining charging capacity of the specific electric vehicle is determined as equal to or less than the preset value, controlling the first fee to be imposed on the specific electric vehicle and (ii) if the remaining charging capacity of the specific electric vehicle is determined as greater than the preset value, controlling the second fee to be imposed on the specific electric vehicle.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media may include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which may be executed by a computer. The aforementioned hardware device can work as more than a software module to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the spirit of the present disclosure must not be confined to the explained embodiments, and the following patent claims as well as everything including variations equal or equivalent to the patent claims pertain to the category of the spirit of the present disclosure.

What is claimed is:

1. A method for controlling charging capacity of an electric vehicle charging terminal capable of charging a specific electric vehicle, comprising steps of:
    (a) an electric vehicle charging station, while the electric vehicle charging terminal is connected to the specific electric vehicle, via at least one specific charging connector among a first charging connector to an n-th charging connector, wherein the electric vehicle charging station manages a plurality of unit charging sources and includes the electric vehicle charging terminal, which is electrically connected with a grouped charging source created by combining at least part of the plurality of the unit charging sources, and wherein capacity of the grouped charging source is dependent on a cardinal number of combined part of the plurality of the unit charging sources, selecting at least two specific unit charging sources to be combined, among the plurality of the unit charging sources, as a specific grouped charging source by referring to specific required charging capacity information of the specific electric vehicle; and
    (b) the electric vehicle charging station (i) controlling switches for electrically connecting the specific unit charging sources, to thereby create the specific grouped charging source and (ii) allowing the specific grouped charging source to charge the specific electric vehicle through the specific charging connector,
    wherein the electric vehicle charging station,
    (i) if a k-th electric vehicle is connected as the specific electric vehicle to a k-th charging connector among the first charging connector to the n-th charging connector, refers to remaining charging time information of the k-th electric vehicle and spare time information of the k-th electric vehicle, as information on the k-th electric vehicle and
    (ii) if a (k+1)-th electric vehicle is connected to a (k+1)-th charging connector among the first charging connector to the n-th charging connector, further refers to remaining charging time information of the (k+1)-th electric vehicle and spare time information of the (k+1)-th electric vehicle, as information on the (k+1)-th electric vehicle, and
    wherein, if a value of the remaining charging time information of the k-th electric vehicle is determined as less than a value of the spare time information of the k-th electric vehicle and if a value of the remaining charging time information of the (k+1)-th electric vehicle is determined as greater than a value of the spare time information of the (k+1)-th electric vehicle,
    the electric vehicle charging station controls at least one mobile unit charging source, which is at least part of the specific unit charging sources included in a k-th grouped charging source for the k-th electric vehicle, such that the mobile unit charging source is further connected to a (k+1)-th grouped charging source created in response to required charging capacity information of the (k+1)-th electric vehicle.

2. The method of claim 1, wherein, at the step of (a), if the specific required charging capacity of the specific electric vehicle is determined as greater than initially set charging capacity calculated by referring to a cardinal number of initial unit charging sources electrically connected to their corresponding specific charging connector, the electric vehicle charging station controls at least part of available unit charging sources, which are not used for charging, such that the at least part of the available unit charging sources is further connected to the initial unit charging sources electrically connected to their corresponding specific charging connector, to thereby allow the electric vehicle charging station to create the specific grouped charging source at the step of (b), wherein the at least part of the available unit charging sources is selected by referring to a difference between the specific required charging capacity and the initially set charging capacity.

3. The method of claim 1, wherein the electric vehicle charging terminal, by referring to information on remaining charging capacity of the specific electric vehicle at a specific point of time while the specific electric vehicle is charged, (i) if the remaining charging capacity of the specific electric vehicle is determined as equal to or less than a preset value, controls a first fee to be imposed on the specific electric vehicle and (ii) if the remaining charging capacity of the specific electric vehicle is determined as greater than the preset value, controls a second fee to be imposed on the specific electric vehicle.

* * * * *